United States Patent
Yoshimoto et al.

(10) Patent No.: US 8,474,257 B2
(45) Date of Patent: Jul. 2, 2013

(54) EXHAUST TURBINE EQUIPPED WITH EXHAUST CONTROL VALVE

(75) Inventors: Takashi Yoshimoto, Sagamihara (JP); Yasuaki Jinnai, Sagamihara (JP); Masaki Tojo, Sagamihara (JP); Noriyuki Hayashi, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 524 days.

(21) Appl. No.: 12/673,431

(22) PCT Filed: Mar. 11, 2009

(86) PCT No.: PCT/JP2009/055224
§ 371 (c)(1),
(2), (4) Date: Feb. 26, 2010

(87) PCT Pub. No.: WO2009/119392
PCT Pub. Date: Oct. 1, 2009

(65) Prior Publication Data
US 2011/0126537 A1    Jun. 2, 2011

(30) Foreign Application Priority Data
Mar. 28, 2008  (JP) .................................. 2008-086428

(51) Int. Cl.
*F02D 23/00*    (2006.01)
*F02B 33/44*    (2006.01)
*F02G 3/00*    (2006.01)
*F16K 31/44*    (2006.01)

(52) U.S. Cl.
USPC ................ 60/602; 60/605.1; 60/614; 60/615; 251/247

(58) Field of Classification Search
USPC ................... 60/602, 605.1, 614, 615; 251/72, 251/247, 338
See application file for complete search history.

(56) References Cited

U.S. PATENT DOCUMENTS 7,080,510 B2 * 7/2006 Ishihara et al. ................ 60/602
2006/0213195 A1 * 9/2006 Leavesley .................... 60/605.1

FOREIGN PATENT DOCUMENTS

| DE | 10 2007 018 618 A1 | 10/2007 |
| JP | 63-205420 A | 8/1988 |
| JP | 5-248253 A | 9/1993 |
| JP | 7-10434 U | 2/1995 |
| JP | 2002-71039 A | 3/2002 |
| JP | 2002-267034 A | 9/2002 |

OTHER PUBLICATIONS

European Search Report dated Apr. 11, 2013.

* cited by examiner

*Primary Examiner* — Kenneth Bomberg
*Assistant Examiner* — Audrey K Bradley
(74) *Attorney, Agent, or Firm* — Birch, Stewart, Kolasch & Birch, LLP

(57) ABSTRACT

Provided is an exhaust turbine equipped with an exhaust control valve which can reduce wear of the contact surfaces between the shaft and the bushing or the turbine casing. The exhaust turbine is equipped with the exhaust control valve for opening/closing an exhaust bypass passage leading the exhaust turbine being driven by exhaust gas output from an engine to an exhaust outlet passage while bypassing the exhaust turbine, wherein the exhaust control valve comprises a shaft which is supported rotation-freely by a turbine casing and supports a valve element, an arm equipped with a connecting part with a drive source and turning the shaft about the axis thereof by the reciprocating motion of the connecting part produced by the drive source, and a weight attached to an end on the side opposite to the connecting part with the drive source with respect to the axis of the shaft.

3 Claims, 3 Drawing Sheets

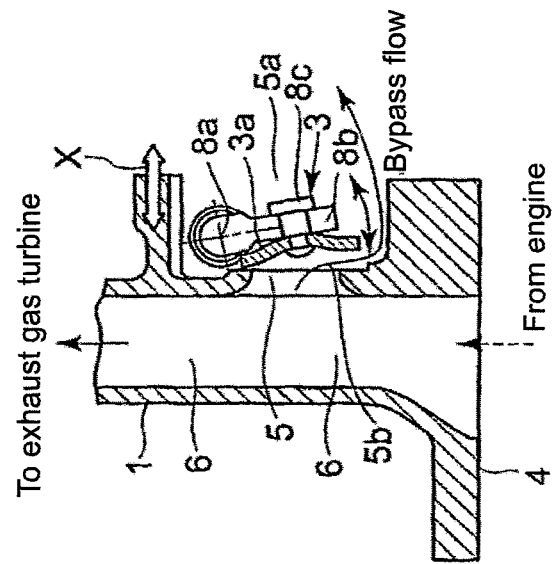
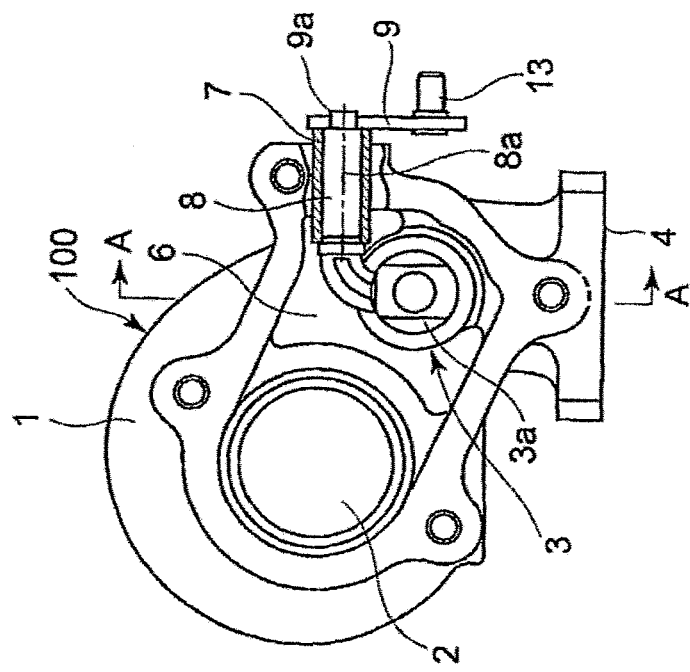
Fig. 3(A) PRIOR ART
Fig. 3(B) PRIOR ART

EXHAUST TURBINE EQUIPPED WITH EXHAUST CONTROL VALVE

BACKGROUND OF THE INVENTION

1. Field of the Invention

The present invention relates to an exhaust gas turbine that is driven by exhaust gas emitted from an engine, more specifically, the present invention relates to an exhaust gas turbine equipped with an exhaust gas control valve, i.e. a waste gate valve, for closing and opening an exhaust gas bypass passage so that the exhaust gas emitted from an engine bypasses the exhaust gas turbine and flows into an exhaust gas outlet passage.

2. Background of the Invention

In an exhaust gas turbocharger of a relatively smaller size class, the exhaust gas turbine therein that is driven by the exhaust gas emitted from the engine is provided with a waste gate valve for closing and opening the exhaust gas bypass passage through which the exhaust gas emitted from the engine toward the exhaust gas turbine bypasses the exhaust gas turbine and flows into an exhaust gas (waste gas) outlet passage; in a case where the flow rate of the exhaust gas toward the turbine becomes excessive, the waste gate is relatively opened so that a part of the exhaust gas toward the turbine bypasses the turbine and flows into the exhaust gas outlet passage; and, the flow rate through the turbine is controlled so as to be kept at an pertinent flow rate level. Thus, the engine boost pressure during the higher load side operation is enhanced by relatively closing the waste gate valve that is relatively opened during the lower load side operation where the exhaust gas flow rate is surplus. It is noted that the term "relatively open" or "relatively close" means that the valve is not of an on-off type.

FIGS. 3(A) and 3(B) show the structure of the waste gate valve (the exhaust gas flow rate control valve) as well as the structure around the waste gate valve in the exhaust gas turbine of the exhaust gas turbocharger; FIG. 3(A) shows a longitudinal section as to the drive part of the waste gate valve; FIG. 3(B) shows the A-A cross section in FIG. 3(A).

The exhaust gas turbine 100 shown in FIGS. 3(A) and 3(B) comprises: a turbine casing 1 in which a turbine 2 (detail not shown) is provided; a waste gate valve 3 through which the exhaust gas that is supplied from the engine (not shown) toward the turbine 2 is diverged in an exhaust gas passage 6 to bypass the turbine 2, and flows into an exhaust gas (waste gas) outlet passage 5a, through an exhaust gas bypass passage 5. In addition, the numeral 4 denotes an exhaust gas inlet flange (of the turbine casing 1) by which the waste gate valve is fitted to the engine or a pertinent component relating to the engine.

A valve body 3a of the waste gate valve 3 opens and closes the exhaust gas bypass passage 5 with reciprocating movements or hinge-like movements; in closing the exhaust gas bypass passage 5, the valve body 3a sit on a valve seat 5b that is formed on the outer side surface of the turbine casing 1 around the exhaust gas bypass passage 5; in opening exhaust gas bypass passage 5, the valve body 3a leaves the valve seat 5b so that a part of the exhaust gas (the bypassing exhaust gas) flows from the exhaust gas passage 6 into the exhaust gas (waste gas) outlet passage 5a along the curved arrow direction as depicted in FIG. 3(B).

A support axis (shaft) 8 of an L-shape is fastened to the valve body 3a of the waste gate valve 3, at an end part 8b of the support axis (shaft) 8, by means of a rivet (coupling) 8c. The support axis (shaft) 8 is rotation-freely (swing-freely) fitted in a bush 7 that is fixed to the turbine casing 1 (or, in a guide hole that is provided in the turbine casing 1).

An arm 9 is fixed to a shaft end part of the support axis (shaft) 8, by means of a caulking device 9a or the like. The arm 9 is provided with a connecting part 13 via which the support axis (shaft) 8 is connected to an actuator (not shown) therefor. Thus, according to the swing movements of the connecting part 13, the support axis (shaft) 8 is rotated or swung around an axis 8a thereof; further, via the rotation (rotational swing) movements of the support axis (shaft) 8, the valve body 3a of the waste gate valve sits on or leaves the valve seat 5b, namely the valve body opens or closes the exhaust gas bypass passage 5.

In the patent reference 1 (JP1995-10434), a technology is disclosed regarding a method for firmly locking a swing arm as well as a swing lever of the waste gate valve; whereby, a spring-biased lock lever interlocks the swing lever (and the swing arm) in a manner that a cam surface of the lock lever comes in contact with a cam surface of an end part of the swing lever, and presses the latter cam surface along the contact tangential direction so that the former cam surface interlocks the latter cam surface when the waste gate valve is closed and a control rod is placed at a retired position. Thus, the patent reference 1 provides a technology whereby the valve body of the waste gate valve is firmly fixed to a predetermined valve-closing position.

As shown in FIGS. 3(A) and 3(B), through the waste gate valve 3, the exhaust gas that is supplied from the engine toward the exhaust gas turbine 2 is diverged in the exhaust gas passage 6 which is located upstream of the turbine 2; a part of the exhaust gas before the turbine 2 bypasses the turbine 2, and flows into the exhaust gas (waste gas) outlet passage 5a, through the through an exhaust gas bypass passage 5.

Further, according to the swing movements of the connecting part 13 via which the support axis (shaft) 8 is connected to the actuator therefor, the support axis (shaft) 8 is rotated (swung) around an axis 8a thereof; thus, via the rotation (rotational swing) movements of the support axis (shaft) 8, the valve body 3a of the waste gate valve sits on or leaves the valve seat 5b, namely the valve body opens or closes the exhaust gas bypass passage 5.

The bearing area between the bush 7 and the support axis (shaft) 8 that are exposed to the exhaust gas of high temperature is of an oil free type as it is difficult to provide the bearing area with a lubrication condition; thus, the running surfaces as to the bush 7 and the support axis (shaft) 8 of the waste gate valve 3 is prone to wear down in response to the frequency of use (or the operating hours) thereof.

In addition to the non-lubrication condition, or in response to the trend of the nowadays boost increasing, the levels of the waste gate valve vibration along the X-arrow direction as shown in FIG. 3(B) the vibration which is caused by the engine vibration or the exhaust gas flow pulsation become greater and greater; thus, it becomes a prerequisite to restrain the wear around the bearing area between the bush 7 and the support axis (shaft) 8, in consideration of not only the valve closed condition but also over the whole operating conditions.

As a matter of fact, in the conventional technology of the patent reference 1 (JP1995-10434), the valve body of the waste gate valve is firmly pressed and maintained to a predetermined location in a case where the valve is closed; however, the valve body is not firmly maintained at an expected location in a case where the valve is half-opened. In other words, the vibration reduction effect as to the waste gate valve cannot exceed the desired level, in the case where the valve is half-opened.

DISCLOSURE OF THE INVENTION

In view of the above described subjects in the conventional technology, the present invention aims at providing an exhaust gas turbine equipped with an exhaust gas control valve (a waste gate valve) comprising: a support axis (shaft) that controls the movement of the valve body of the exhaust gas control valve; a bush (or a guide hole in the turbine casing of the exhaust gas turbine) in which the support axis (shaft) is rotation-freely or swing-freely fitted; wherein, the wear of the fitting clearance area (between the support axis shaft and the bush hole (or the casing hole) can be reduced over the whole operating range as to the exhaust gas control valve.

In order to reach the goal of the invention, the present invention discloses an exhaust gas turbine driven by exhaust gas emitted from an engine and being equipped with an exhaust gas control valve for closing and opening an exhaust gas bypass passage through which the exhaust gas emitted from an engine bypasses the exhaust gas turbine and flows into an exhaust waste gas outlet passage, the exhaust gas control valve comprising:

a support axis shaft for supporting a valve body for controlling the opening of the exhaust gas bypass passage, the support axis shaft being rotation-freely or swing-freely supported in a turbine casing of the turbine;

an arm for rotating or swinging the support axis shaft around an axis of the support axis shaft by reciprocating rotational movements or swing movements that are transferred from a drive source to the arm via a connecting part provided to the arm at an end part of the arm; and a weight equipped at an arm end part opposite to where the connecting part is provided, with respect to the axis of the support axis shaft.

Regarding the above-described invention, the preferable embodiments are:

(1) the exhaust gas turbine equipped with an exhaust gas control valve according to the above disclosure, a valve body center of the exhaust gas control valve is located at a predetermined distance apart from the connecting part via which the running gears or moving parts of the exhaust gas control valve are operated, in the direction of the axis of the support axis shaft; and, the center of gravity of the weight in the direction of the axis is placed at a position between the connecting part and the valve body center;

(2) the exhaust gas turbine equipped with an exhaust gas control valve according to the above disclosure, wherein the middle part of the arm is fixed to the support axis shaft, the weight is equipped at the arm end part opposite to the other arm end part at which the connecting part is placed and transfers the operation movements from the drive source to the moving parts of the waste gate valve, further wherein, the weight is fastened to the arm by means at least one self-locking nut and a bolt.

Another preferable embodiment is the exhaust gas turbine equipped with an exhaust gas control valve according to the above disclosure or the above preferable embodiment (2), wherein the arm and the weight are formed as a single piece made by casting or forging, and the middle part of the arm is fixed to the support axis shaft.

According to the present invention as described above, the exhaust gas control valve (the waste gate valve) comprising:

the support axis shaft for supporting the valve body for controlling the opening of the exhaust gas bypass passage, the support axis shaft being rotation-freely or swing-freely supported in the turbine casing of the turbine;

the arm for rotating or swinging the support axis shaft around the axis of the support axis shaft by reciprocating rotational movements or swing movements that are transferred from a drive source to the arm via the connecting part provided to the arm at the end part of the arm; and the weight equipped at the arm end part opposite to where the connecting part is provided, with respect to the axis of the support axis shaft.

More concretely, the valve body center of the exhaust gas control valve is located at the predetermined distance apart from the connecting part via which the running gears or moving parts of the exhaust gas control valve are operated, in the direction of the axis of the support axis shaft; and, the center of gravity of the weight in the direction of the axis is placed at a position between the connecting part and the valve body center.

Further concretely, the middle part of the arm is fixed to the support axis shaft, the weight is equipped at the arm end part opposite to the other arm end part at which the connecting part is placed and transfers the operation movements from the drive source to the moving parts of the waste gate valve, further wherein, the weight is fastened to the arm by means at least one self-locking nut and a bolt.

In addition, as a matter of great import, the weight is equipped at an (arm) end part counter to the (arm) connecting part with regard to the axis of the support axis shaft.

Therefore, the inertia mass (the moment of inertia) around the axis as to the running gear parts of the waste gate valve is increased due to the provided weight, in contrast to the conventional way; thus the swing vibration of the valve body around the axis of the support axis shaft due to the pressure pulsation in the exhaust gas emitted from the engine can be restrained.

Moreover, due to the increased moment of inertia as to the moving parts of the exhaust gas control valve thereby the increased moment of inertia is attributable to the provided weight that is equipped at the end part counter to the connecting part via which the moving parts of the exhaust gas control valve are operated as per the movements of drive source, the angular velocity change as to the swing movement of the arm and the support axis shaft in response to the engine exhaust gas pressure pulsation can be smooth; thus, the relative movement between the bush (or a hole in the turbine casing to place the support axis shaft) and the support axis shaft connected to the valve body can be also smooth. In this way, the vibration levels of the exhaust gas control valve can be reduced over the whole operation zone of the valve body (in the middle operation zone of the valve body or under the closed condition thereof).

Further, in this embodiment, the center of the exhaust gas control valve (namely, the center of the valve body) is located at a predetermined distance S from the connecting part via which moving parts of the exhaust gas control valve are operated as per the movements of drive source, in the direction of the axis of the support axis shaft (cf. claim 2). As for the position of the provided weight in the direction along the axis of the support axis shaft, the center of gravity of the provided weight is placed between the connecting part and the valve body center. Thanks to the balance between the mass around the provided weight and the mass around the connecting part, the center of the gravity as to the moving parts gets closer to the axis of the support axis shaft; thus, the tilting moment (or pitching moment) induced by the engine vibration the moment which works the support axis shaft can be reduced. In addition, the provided weight is firmly fastened to the arm by use of the self-locking nut and the bolt therefor; thus, there is no apprehension that the provided weight comes off.

Further, according to the present invention, the arm and the provided weight are formed as a single-piece construction made by casting or forging; the middle part of the arm is fitted to the support axis shaft; thus, this embodiment brings effective results, as is the case with the former embodiment; in addition, since the arm and the provided weight are formed as a single-piece construction made by casting or forging, the number of components as well as the assembly cost can be reduced; further, there is no apprehension that the provided weight comes off, thanks to the single piece configuration; thus, the reliability of the exhaust gas control valve can be enhanced. Moreover, the single piece configuration made by casting or forging can be designed with an enhanced degree of freedom in shape; therefore, the narrow space around the engine can be effectively used.

BRIEF DESCRIPTION OF THE DRAWINGS

FIG. 3(A) shows the structure of the waste gate valve (the exhaust gas flow rate control valve) as well as the structure around the waste gate valve in the exhaust gas turbine of the exhaust gas turbocharger, according to the conventional technology;

FIG. 3(B) shows the A-A cross-section in FIG. 3(A).

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

First Embodiment

Figure 1A:
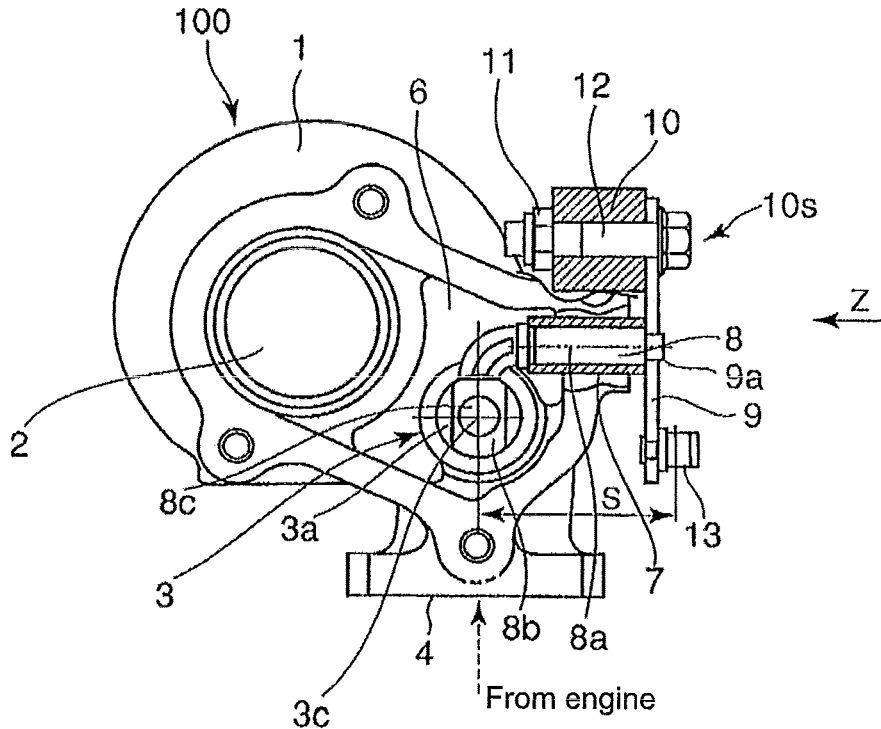
FIG. 1(A) shows the structure of the waste gate valve (the exhaust gas flow rate control valve) as well as the structure around the waste gate valve in the exhaust gas turbine of the exhaust gas turbocharger, according to the first embodiment of the present invention.
Figure 1B:
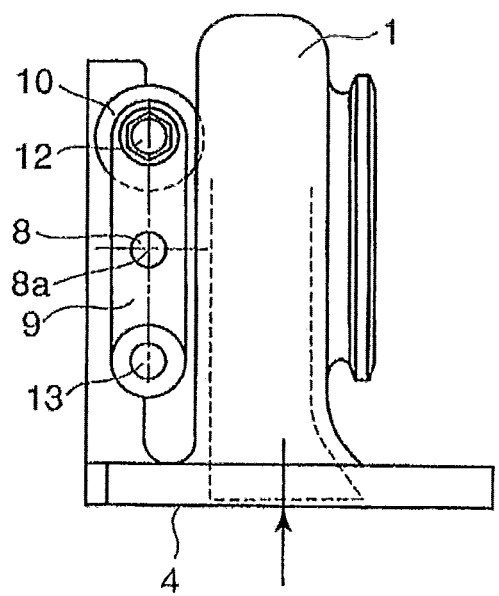
FIG. 1(B) shows a view as to the Z-arrow in FIG. 1(A)

FIG. 1(A) shows the structure of the waste gate valve (the exhaust gas flow rate control valve) as well as the structure around the waste gate valve in the exhaust gas turbine of the exhaust gas turbocharger, according to the first embodiment of the present invention; FIG. 1(B) shows a view as to the Z-arrow in FIG. 1(A).

The exhaust gas turbine 100 shown in FIGS. 1(A) and 1(B) comprises a turbine casing 1 in which a turbine 2 (details not shown) is provided with a waste gate valve 3. The waste gate valve 3, as shown in FIG. 3(A) and FIG. 3(B), is for diverging the exhaust gas emitted from the engine (not shown) to the turbine 2 via an exhaust gas passage 6, in the exhaust gas passage 6 located upstream of the turbine 2 so that the diverged exhaust gas bypasses the turbine 2 and flows to an exhaust gas outlet passage 5a via an exhaust gas bypass passage 5. In addition, the numeral 4 denotes an exhaust gas inlet flange.

As is the case with FIGS. 3(A) and 3(B), a valve body 3a of the waste gate valve 3 opens and closes the exhaust gas bypass passage 5 by reciprocating movements or hinge-like movements. When the exhaust gas bypass passage 5 is in an opening condition apart of the exhaust gas flows into the exhaust gas outlet passage 5a from the exhaust gas passage 6 along the arrow (the curved arrow) direction as depicted in FIG. 3(B).

A support axis (shaft) 8 of a L-shape is fastened to the valve body 3a of the waste gate valve 3 at an end part 8b of the support axis (shaft) 8 by means of a rivet (coupling) 8c. The support axis (shaft) 8 is rotation-freely or swing-freely fitted in a bush 7 that is fixed to the turbine casing 1.

An arm 9 is fixed to a shaft end part of the support axis (shaft) 8, by means of a caulking device 9a or the like. The arm 9 is provided with a connecting part 13 through which the support axis (shaft) 8 is connected to an actuator (not shown) therefor.

Thus far, the configuration of the first embodiment is the same as that depicted in FIGS. 3(A) and 3(B). In this embodiment, a weight 10 is provided to an end part of the arm 9 opposite to the position where the connecting part 13 is attached, with respect to the location where the axis 8a intersects with the arm 9.

In the waste gate valve 3 as shown in FIGS. 1(A) and 1(B), the weight 10 is fastened to the arm (the extended arm) 9 at an end part 10s thereof, by means of a bolt 12 and a self-locking nut 11; thereby, the end part 10s is on the opposite side of the connecting part 13 position, with respect to the location where the axis 8a of the support axis shaft 8 intersects with the arm 9.

As shown in FIG. 1(A), a center of the waste gate valve 3 is located at a position, a valve body center 3c, which is a predetermined distance S away from the position of the connecting part 13, thereby, the position of the weight 10 is between the connecting part 13 and the valve body center 3c.

Thus, in response to the reciprocating movements or swing movements as to the connecting part 13 the movements which are brought by the actuator, the support axis (shaft) 8 is rotated (with reciprocating rotational movements) around the axis 8a so that the valve body 3a sits on the valve seat 5b or leaves the seat, namely, the waste gate valve 3 closes or opens. Regarding the reciprocating rotational movements, the inertia mass (the moment of inertia) of the waste gate valve 3 has been increased by the weight 10, in contrast to the conventional way (FIGS. 3(A) and 3(B)).

In this first embodiment as described above, the waste gate valve 3 comprises the support axis shaft 8 for driving the valve body 3a that is rotation-freely supported by the bush 7, and controls the opening (the degree of openings) as to the exhaust gas bypass passage 5, the extended arm for rotating the support axis shaft 8 around the axis 8a by the reciprocating movements or swing movements as to the arm 9, and the weight 10 equipped at an end part 10s opposite to the connecting part 13 with respect to the axis 8a of the support axis shaft 8, the arm 9 being operated so as to rotate with the reciprocating movements or swing movements by an actuator via the connecting part 13.

Further, the center of the waste gate valve 3 is located at a predetermined distance S from the connecting part 13. As for the position of the center of gravity as to the weight 10 in the direction along the axis 8a, the weight 10 is placed between the connecting part 13 and the valve body center 3c. In addition, the arm 9 is fixed to the support axis (shaft) 8 by means of a caulking device 9a at the middle position of the arm 9. The arm 9 is provided with the connecting part 13 via which the support axis (shaft) 8 is connected to the actuator (not shown). The arm 9 is fitted with the weight 10 at another end part 10s of the arm 9, thereby the end part 10s is located at a position opposite to the connection part 13 with respect to the caulking position (the middle position of the arm 9), the weight 10 being fitted to the arm by means of the bolt and the self-locking nut 11.

According to the above-described configuration as per the first embodiment, the running gear parts (the support axis shaft, the valve body and the extended arm) of the waste gate valve are equipped with the weight 10 that is placed at an end part of the extended arm, the end part located at the opposite side of the arm where the connecting part 13 is provided that performs reciprocating movements or swing movements around the middle part of the extended arm, namely, around the axis 8a of the support axis shaft 8. Therefore, the inertia mass (the moment of inertia) around the axis 8 as to the running gear parts of the waste gate valve is increased due to the weight 10, in contrast to the conventional way; thus the swing vibration of the valve body 3a around the axis 8 due to the pressure pulsation in the exhaust gas emitted from the engine can be restrained.

Moreover, in the above embodiment, due to the increased moment of inertia as to the running gears thereby the increased moment of inertia is attributable to the weight 10 that is equipped at the end part opposite to the connecting part 13, the angular velocity change as to the swing movement of the arm 9 and the support axis shaft 8 in response to the pressure pulsation can be smooth. Thus, the relative movement of the bush 7 and the support axis shaft 8 connected to the valve body 3a can be also smooth. In this way, the vibration levels of the waste gate valve 3 can be reduced over the whole operation zone of the valve body 3a; besides, in the opening levels as to the middle operation zone of the waste gate valve or under the closed condition thereof.

Further, in this embodiment, the center of the waste gate valve 3 (namely, the center 3c of the valve body 3a) is located at a predetermined distance S from the connecting part 13 via which the running gears (moving parts) of the waste gate valve are operated, in relation to the direction of the axis of the support axis shaft. As for the position of the weight 10 in the direction along the axis 8a, the center of gravity of the weight 10 is placed between the connecting part 13 and the valve body center 3c. Thanks to the balance between the mass around the weight 10 and the mass around the connecting part 13, the center of the gravity as to the running gears gets closer to the axis 8a of the support axis (shaft) 8; thus, the tilting moment induced by the engine vibration the moment which works the support axis (shaft) 8 can be reduced. In addition, the weight 10 is firmly fastened to the arm 9 by use of the self-locking nut 11 and the bolt 12 therefor; thus, there is no apprehension that the weight comes off.

Second Embodiment

Figure 2A:
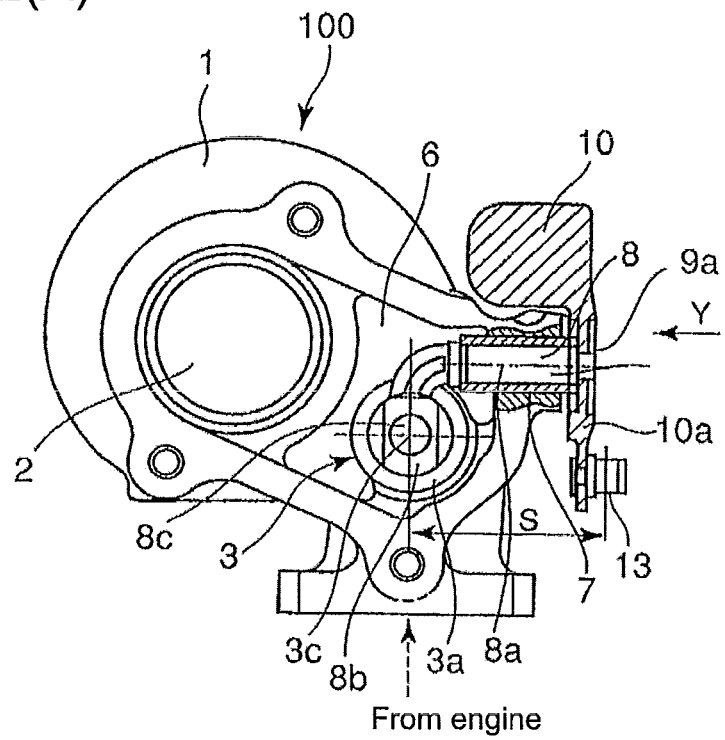
FIG. 2(A) shows the structure of the waste gate valve (the exhaust gas flow rate control valve) as well as the structure around the waste gate valve in the exhaust gas turbine of the exhaust gas turbocharger, according to the second embodiment of the present invention.
Figure 2B:
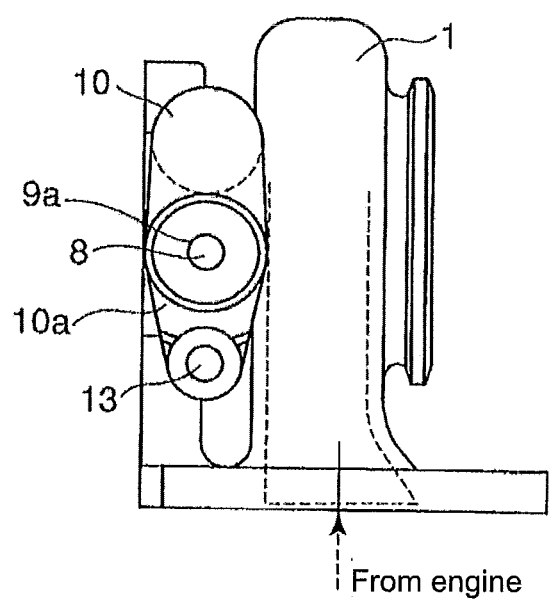
FIG. 2(B) shows a view as to the Y-arrow in FIG. 1(A)

FIG. 2(A) shows the structure of the waste gate valve (the exhaust gas flow rate control valve) as well as the structure around the waste gate valve in the exhaust gas turbine of the exhaust gas turbocharger, according to the second embodiment of the present invention; FIG. 2(B) shows a view as to the Y-arrow in FIG. 1(A).

In this second embodiment as shown in FIG. 2(A), the arm 10a and the weight 10 are formed as a single-piece construction made by casting or forging. The middle part of the arm 10a is fitted to the support axis (shaft)) 8 by means of the caulking device 9a. Other configuration or component arrangement is the same as that of the first embodiment; the common symbols or numerals are used for the common components in the first and the second embodiments The second embodiment brings effective results, as is the case with the first embodiment. In addition, since the arm 10a and the weight 10 are formed as a single-piece construction made by casting or forging metal, the number of components as well as the assembly cost can be reduced. Further, there is no apprehension that the weight comes off due to the single niece configuration. Thus, the reliability of the waste gate valve can be enhanced. Moreover, the single piece configuration made of casting or forging metal can be designed with an enhanced degree of freedom in shape, therefore, the narrow space around the engine can be effectively used.

INDUSTRIAL APPLICABILITY

The present invention can provide an exhaust gas turbine equipped with an exhaust gas control valve (a waste gate valve) comprising: a support axis (shaft)) that controls the movement of the valve body of the exhaust gas control valve; a bush (or a guide hole in the turbine casing of the exhaust gas turbine) in which the support axis (shaft) is rotation-freely or swing-freely fitted; wherein, the wear of the fitting clearance area (between the support axis shaft and the guide hole (or the casing hole) can be reduced over the whole operating range as to the exhaust gas control valve.

The invention claimed is:

1. An exhaust gas turbine driven by exhaust gas emitted from an engine and being equipped with an exhaust gas control valve for closing and opening an exhaust gas bypass passage through which the exhaust gas emitted from the engine bypasses the exhaust gas turbine and flows into an exhaust waste gas outlet passage, the exhaust gas control valve comprising:
   a support axis shaft for supporting a valve body which controls an opening of the exhaust gas bypass passage, the support axis shaft being rotation-freely or swing-freely supported in a turbine casing of the exhaust gas turbine;
   an arm which is provided with a connecting part at an end part thereof for connecting the support axis shaft to an actuator, and rotates or swings the support axis shaft around an axis of the support axis shaft by reciprocating rotational movements or swing movements that are transferred from the actuator; and
   a weight equipped at an end part opposite to where the connecting part is provided, with respect to the axis of the support axis shaft,
   wherein a center of the valve body of the exhaust gas control valve is located at a predetermined distance apart from the connecting part via which running gears or moving parts of the exhaust gas control valve are operated, in the direction of the axis of the support axis shaft; and, the center of gravity of the weight in the direction of the axis is placed at a position between the connecting part and the valve body center.

2. The exhaust gas turbine equipped with an exhaust gas control valve according to claim 1, wherein the arm and the weight are formed as a single piece made by casting or forging, and a middle part of the arm is fixed to the support axis shaft.

3. The exhaust gas turbine equipped with an exhaust gas control valve according to claim 1, wherein a middle part of the arm is fixed to the support axis shaft, the weight is equipped at the end part of the arm opposite to another end part of the other arm, at which the connecting part is provided and transfers the operation movements from the actuator to the moving parts of the waste gate valve, further wherein, the weight is fastened to the arm by means of at least one self-locking nut and a bolt.

* * * * *